(12) United States Patent
Glasser et al.

(10) Patent No.: US 8,862,557 B2
(45) Date of Patent: Oct. 14, 2014

(54) SYSTEM AND METHOD FOR RULE-DRIVEN CONSTRAINT-BASED GENERATION OF DOMAIN-SPECIFIC DATA SETS

(75) Inventors: Joshua David Glasser, Pittsford, NY (US); Gary A. Passero, Penfield, NY (US)

(73) Assignees: ADI, LLC, Rochester, NY (US); ExactData, LLC, Scottsville, NY (US)

( * ) Notice: Subject to any disclaimer, the term of this patent is extended or adjusted under 35 U.S.C. 154(b) by 598 days.

(21) Appl. No.: 12/723,013

(22) Filed: Mar. 12, 2010

(65) Prior Publication Data

US 2011/0153575 A1 Jun. 23, 2011

Related U.S. Application Data

(63) Continuation-in-part of application No. 12/646,356, filed on Dec. 23, 2009, now abandoned.

(51) Int. Cl.
*G06F 17/00* (2006.01)
*G06F 17/30* (2006.01)
*G06F 11/36* (2006.01)

(52) U.S. Cl.
CPC ...... *G06F 17/30539* (2013.01); *G06F 11/3684* (2013.01)
USPC .......................................... 707/690; 707/736

(58) Field of Classification Search
USPC .......................................... 707/690–695, 736
See application file for complete search history.

(56) References Cited

U.S. PATENT DOCUMENTS

| | | |
|---|---|---|
| 5,878,054 A | 3/1999 | Sherwood et al. |
| 6,148,427 A | 11/2000 | Sherwood et al. |
| 6,219,802 B1 | 4/2001 | Beeker et al. |
| 6,502,102 B1 * | 12/2002 | Haswell et al. ........................ 1/1 |
| 7,020,804 B2 | 3/2006 | Burdick et al. |
| 7,058,857 B2 | 6/2006 | Dallin |
| 7,194,479 B1 | 3/2007 | Packham |
| 7,409,619 B2 * | 8/2008 | El Far et al. ................... 714/742 |
| 2004/0078684 A1 * | 4/2004 | Friedman et al. ............... 714/38 |
| 2004/0107202 A1 | 6/2004 | Burdick et al. |

(Continued)

OTHER PUBLICATIONS

IBM, User's Guide, IBM DB2 Test Database Generator for Multiplatforms and z/OS, 2007, 348 pages, Version 2 Release 2, Rocket Software Inc., USA.

(Continued)

*Primary Examiner* — Hosain Alam
*Assistant Examiner* — Navneet K Ahluwalia
(74) *Attorney, Agent, or Firm* — Brian B. Shaw, Esq.; Thomas B. Ryan, Patent Agent; Harter Secrest & Emery LLP

(57) ABSTRACT

A data generation system provides for generating domain-specific, context-sensitive data collections as synthetic data for testing the performance of data processing systems. Within the data generation system, a composition module defines a data generation template containing a plurality of fields each capable of holding one or more values according to specifications defined for predetermined data types. An evaluation module sorts the fields in an order of dependency so that fields whose values affect the values in other of the fields are ordered before the fields whose values are affected by values in other fields. A data generation module populates the fields with values and retrieves a subset of the values populating the plurality of fields for generating each of a plurality of data sets, which are written into memory and made accessible for use in testing data processing systems.

34 Claims, 22 Drawing Sheets

(56) References Cited

U.S. PATENT DOCUMENTS

| | | | |
|---|---|---|---|
| 2005/0033761 A1 | | 2/2005 | Guttman et al. |
| 2005/0193269 A1* | | 9/2005 | Haswell et al. ............... 714/38 |
| 2005/0246390 A1 | | 11/2005 | House et al. |
| 2005/0268171 A1 | | 12/2005 | House et al. |
| 2007/0168813 A1* | | 7/2007 | El Far et al. ............... 714/738 |
| 2008/0065941 A1 | | 3/2008 | Lemmel et al. |
| 2008/0077530 A1* | | 3/2008 | Banas et al. ............... 705/50 |
| 2008/0126346 A1 | | 5/2008 | Zheng |
| 2008/0196002 A1* | | 8/2008 | Koster ............... 717/106 |
| 2008/0244317 A1 | | 10/2008 | Yano et al. |
| 2009/0076841 A1* | | 3/2009 | Baker et al. ............... 705/2 |

OTHER PUBLICATIONS

Lin, Development of a Synthetic Data Set Generator for Building and Testing Information Discovery Systems, Third International Conference on Information Technology: New Generations, 2006, 6 pages, IEEE, United States.

Maciejewski, Generating Synthetic Syndromic Surveillance Data for Evaluating Visual-Analytics Teechniques, IEEE Computer Graphics and Applications, May/Jun. 2009, pp. 18-28, IEEE Computer Society.

Lombardo, A Method for Generation and Distribution of Synthetic Medical Record Data for Evaluation of Disease-Monitoring Systems, John's Hopkins APL Technical Digest, vol. 27, No. 4, 2008, pp. 356-365.

Jeske, Synthetic Data Generation Capabilities for Testing Data Mining Tools, IEEE Military Communications Conference, 2006, 6 pages.

Macia, Genetic-Based Synthetic Data Sets for the Analysis of Classifiers Behavior, Eighth International Conference on Hybrid Intelligent Systems, IEEE, 2006, 6 pages.

Watkins, Using GIS to Create Synthetic Disease Outbreaks, BMC Medical Informatics and Decision Making, Feb. 14, 2007, 14 pages.

Eno, Generating Synthetic Data to Match Data Mining Patterns, Architectural Perspectives published by IEEE Computer Society, 2008, 5 pages.

forSQL Data Generator—Easy and Quick Way to Generate Test Data for Your Database, forsql.com, Retrieved Aug. 21, 2009, 2 pages.

GS Data Generator, gsapps.com, Retrieved Aug. 21, 2009, 2 pages.

TurboData, Turbo Computer Systems turbodata.ca, Retrieved Aug. 21, 2009, 3 pages.

20 Ways to Use TestersDesk.com for Software Test Design and Test Data Generation, testersdesk.com, Retrieved Jul. 30, 2009, 11 pages.

IBM, IBM DB2 and IMS Tools and IBM WebSphere Information Integration Tools, 2007, 4 pages, USA.

DTM Data Generator, sqledit.com, Retrieved Aug. 21, 2009, 2 pages.

\* cited by examiner

COMPOSE TEMPLATE

START TEMPLATE

DEMO   Row Types:   REGULAR ☐   CONSTANT OR HIDDEN ☐   REMOVED ☐   [CLOSE]

Your settings will be saved each time you edit the form. If you would like to create a copy of this form, please click on the link below
Save a copy of This Form

DATA GENERATION OPTIONS   [GENERATE DATA]

1 Choose output format    2 Specify # of records [100]
- ● HTML
- ○ AUTODTD INPUT
- ○ CSV
- ○ LM-DRIS TRUTH

TEMPLATE OPTIONS
Please set these options before editing your template

CHOOSE COUNTRIES:   ☑ USA   ☑ CANADA   ☑ UK
CHOOSE LANGUAGES:   ☑ ENGLISH   ☑ FRENCH
FILTER OPTIONS:   ☑ TREAT 0'S AS BLANKS

[SAVE AS DEFAULT]   [RESET TO DEFAULT]

ENTER GLOBAL DATA

*FIG. 4*

ADD NEW ROW | CLOSE

1  NAME
   [Person 1]
   DATA TYPE
   [Select Data Type ▽]
   GROUP
   [         ]  ☐ HIDDEN  ☐ CONSTANT
   FORM PAGE
   [    ]
   COMMENTS ON FIELD
   [            ]

[SAVE]
   [CANCEL]

ADD NEW FIELD

ADD NEW ROW

NAME
Person 1

DATA TYPE
Person

GROUP

☐ HIDDEN   ☐ CONSTANT

FORM PAGE
ENTER A PAGE NUMBER

COMMENTS ON FIELD

OPTIONS

KNOBS IN USE

Name.Capitalization

[Add] [Remove]

Name.Capitalization

Control the capitalization of generated text

☐ ALL UPPER                                  [ ] %
☐ ALL LOWER                                  [ ] %
☑ FIRST CHAR UPPER, REMAINDER LOWER  [100] %
☐ UPPERCASE WORDS                            [ ] %
☐ RANDOM                                     [ ] %

[SAVE]
[CANCEL]

[CLOSE]

○ Internet

DEFINE FIELD PART

*FIG. 7*

NAME
Person 1
DATA TYPE
Person
GROUP

☐ HIDDEN  ☐ CONSTANT
FORM PAGE  ENTER A PAGE NUMBER
COMMENTS ON FIELD

OPTIONS

KNOBS IN USE
Name Capitalization
FirstName
Name.Middlename
LastName (Add) (Remove)

LastName

Specify the source of data for the surname
SELECT FROM
○ THIS LIST:

⦿ DB TABLE:
surnames
⊕ DB LIST PREVIEW

HOW MANY
⦿ EXACTLY:
○ AT MOST: 1
UNIQUENESS
☐ ENSURE UNIQUENESS OF SELECTION

SAVE
CANCEL

DEFINE FIELD PART
*FIG. 8*

FIG. 9

Add New Row

1. NAME: Person 2 Age
   DATA TYPE: Bounded Range ▼
   GROUP: [____]
   ☐ HIDDEN  ☐ CONSTANT
   FORM PAGE: [____] ENTER A PAGE NUMBER
   COMMENTS ON FIELD: [◁____▷]

OPTIONS:
   PICK A NUMBER BETWEEN
   ○ VALUE [1]  ● FIELD # [3]
   AND
   ○ VALUE [10]  ● FIELD # [3]
   ☑ OFFSET BY
   ○ ADD  ● SUBTRACT
   NUMBER BETWEEN [28] AND [40]
   ☐ PAD RESULT

[Reset to Default]

Option Help

[SAVE]
   [CANCEL]

[CLOSE]

ADD FIELD - CHOOSE TYPE

*FIG. 10*

Add New Row

1  NAME
   Person 1 Last Name
   DATA TYPE
   Multiple Value Field Accessor ▾
   GROUP
   ☐ HIDDEN  ☐ CONSTANT
   FORM PAGE
   ENTER A PAGE NUMBER
   COMMENTS ON FIELD

OPTIONS

GET VALUES FROM FIELD # [1]
Person ▾
DATA FROM FIELD PART:
LastName ▾
[Reset to Default]
Option Help

SAVE
CANCEL

CLOSE

ADD FIELD - CHOOSE TYPE

Add New Row — CLOSE

6  NAME: Person 2 Last Name
DATA TYPE: Multiple Value Field Accessor
GROUP:
☐ HIDDEN  ☐ CONSTANT
FORM PAGE: ENTER A PAGE NUMBER
COMMENTS ON FIELD OPTIONS:
GET VALUES FROM FIELD #: 1
Person
DATA FROM FIELD PART:
LastName
Reset to Default
Option Help

SAVE
CANCEL

ADD FIELD - CHOOSE TYPE

| | REGULAR | CONSTANT OR HIDDEN | REMOVED |
|---|---|---|---|
| demo Row Types: | | | |

Your settings will be saved each time you edit the form. If you would like to create a copy of this form, please click on the link below. [CLOSE]

Save a Copy of This Form

---

DATA GENERATION OPTIONS      [GENERATE DATA]

| 1 Choose output format | 2 Specify # of records |
|---|---|
| ⦿ HTML<br>○ AUTODTD INPUT<br>○ CSV<br>○ LM-DRIS TRUTH | [100] |

---

TEMPLATE OPTIONS    [SAVE AS DEFAULT] [RESET TO DEFAULT]

Please set these options before editing your template.
Choose countries: ☑USA ☑CANADA ☑UK
Choose languages: ☑ENGLISH FRENCH
Filter options: ☐TREAT 0'S AS BLANKS

| 5 | | | [CLOSE] |
|---|---|---|---|
| 1 | Person 1 | Person | ⊘EDIT ⊗REMOVE |
| 2 | Person 2 | Person | ⊘EDIT ⊗REMOVE |
| 3 | Person 1 Age | Number-Range | ⊘EDIT ⊗REMOVE |
| 4 | Person 2 Age | Bounded-Number-Range | ⊘EDIT ⊗REMOVE |
| 5 | Person 1 Last Name | MultiValueFieldAccessor | ⊘EDIT ⊗REMOVE |
| 6 | Person 2 Last Name | MultiValueFieldAccessor | ⊘EDIT ⊗REMOVE |

COMPLETE TEMPLATE

*FIG. 13*

EVALUATE TEMPLATE

INTRODUCE ERRORS

1
```
NAME
[          ]
DATA TYPE
[OMR String ▼]
GROUP
[          ]  ⟩OPTIONS
☐ HIDDEN  ☐ CONSTANT
FORM PAGE
[      ] ENTER A PAGE NUMBER
COMMENTS ON FIELD
[          ]
```

CHOOSE A PRELOADED OPTION
[PLEASE SELECT ▼]

Marks: [1|0]
Length: [    ]

⊕ INDEX ALIASES
⊕ EVENT TAGS

Kind of Selection
⊙ RANDOM DISTRIBUTION
○ DEFINED

[ 0] % PICK NONE
[100] % PICK ONE
  ⊙ UNIFORM SELECTION DISTRIBUTION
  ○ WEIGHTED SELECTION DISTRIBUTION
  ⊕ SELECTION DISTRIBUTION VALUES
[ 0] % PICK TWO OR MORE
  ⊙ UNIFORM QUANTITY DISTRIBUTION
  ○ WEIGHTED QUANTITY DISTRIBUTION
  ⊕ QUANTITY DISTRIBUTION VALUES
N/A % TOTAL
*Defined Selection Values must add up to 100%*
☐ NO-YES GROUP
  ⊙ NO-YES GROUP  ⊙ YES-NO GROUP
☐ ASSIGN MARKS TO OMR FIELDS
In Group [          ]
☐ Construct using mark types from fields

[ Reset to Default ]

[ Option Help ]

OMR FIELD

*FIG. 21*

1 NAME
[          ]
DATA TYPE
[ If Then Else Field     ⌄ ]
GROUP
[          ] ⟨OPTIONS
☐ HIDDEN  ☐ CONSTANT
FORM PAGE
[          ] ENTER A PAGE NUMBER
COMMENTS ON FIELD
[          ]

FREQUENCY THIS RULE SHOULD APPLY: [100] %
⊕ EVENT TAGS
⊖ ENTER OPTIONS BELOW   [ADD CONDITION] [REMOVE CONDITION]
If the value of
FIELD # FIELD PART:
[     ] [ N/A        ⌄ ]
Is equal to:
   ○ TRUE
   ○ FALSE
   ○ BLANK
   ○ NUMERICAL
   ○ NONNUMERICAL
   ⊙ CHECK IF VALUE IS
       ○ <  ○ <= ⊙ =  ○ >=  ○ >  ○ |=
       ⊙ VALUE [          ]
       ○ FIELD # # [     ]

Then for
FIELD(S) # [          ]
   ⊙ SET VALUE TO " " (BLANK)
   ○ SET VALUE TO [          ]
   ○ GET TO VALUE OF FIELD # [     ]
☐ Else for
FIELD(S) # [          ]
   ⊙ SET VALUE TO " " (BLANK)
   ○ SET VALUE TO [          ]
   ○ GET TO VALUE OF FIELD # [     ]

[ Reset to Default ]

[ Option Help ]

CONDITIONAL FIELD
*FIG. 22*

SYSTEM AND METHOD FOR RULE-DRIVEN CONSTRAINT-BASED GENERATION OF DOMAIN-SPECIFIC DATA SETS

TECHNICAL FIELD

The invention relates to the generation of test data, particularly domain-specific test data representative of actual population groups, based on user definable fields and field rules processable for producing computer-readable output files for testing the performance of data processing systems, including data capturing systems, data mining systems, form processing, and data management systems.

BACKGROUND OF THE INVENTION

Test data can be of great value for testing data processing systems. In comparison to actual data drawn from specific domains, the truth value of the test data is known so that any errors in the processing of the data can be distinguished from errors in the data itself. As the sophistication of the data processing programs increases, the test data must also increase in sophistication to maintain realism and support the evaluation of complex processing procedures and algorithms that exploit contextual relationships and other expectations about the actual data.

For example, data capturing systems now use contextual data to improve the speed and accuracy with which information is acquired. Typically, data is acquired from hand-printed forms using optical character recognition (OCR) systems supplemented by human key entry systems. The OCR system begins either by trying to read an entire form field at once and comparing a provisional field answer to large dictionaries of possible outcomes or by segmenting the form field into separate characters and reassembling the characters into a provisional field answer. A preliminary confidence value is calculated that reflects the OCR system's assessment that it has the correct answer, e.g., the degree to which the hand-printed data matches recognized character or word forms. More sophisticated recognition systems use context-related information to make adjustments to this confidence value. For example, if a last name is read as "JOHNSON" on a form from a given household, and there are several other people in the same household whose names are read as "JOHNSSON", then the recognition system may reduce the confidence value for the "JOHNSON" answer. As another example, if a person's first name is read as "Clara" and if a corresponding check-box question for the person's sex is read as "Male" instead of "Female", then the confidence in the "Male" answer may be lowered. When all the pertinent context information has been utilized, the final confidence value is compared to a previously established "confidence threshold" to decide if the provisional answer in question will be "accepted" or "rejected". If accepted, the field answer can be placed into the database without being seen by a human, but if rejected, field image information is shown to a human to key the correct answer from the image. The ability of the data capture systems to assign proper confidence values to field data being recognized is one of the keys to high quality data capture system performance.

Realistic test data for evaluating data capturing systems should not only be context-related within individual records (e.g., individual forms) but should also include controllable distributions of data among the records including modeled errors for evaluating the performance of data capturing systems. Such data allows the validity of assumptions to be assessed, criteria tuned, and logic and other rule forms tested for efficacy or functioning as intended.

Similarly, test data of increasing sophistication is necessary for more fully evaluating data processing systems for processing domain-specific data, such as Census data, Internal Revenue Service data, financial transactions, and medical records. Such test data should not only model real-world data but should also be controllable in terms or real-world variables for (a) posing questions and monitoring the responsiveness of the processing systems to changing conditions or assumptions or (b) evaluating the fidelity of processing programs for carrying out complex rules or the efficacy of the rules themselves for achieving desired outcomes.

SUMMARY OF THE INVENTION

The invention meets these needs for more sophisticated test data by providing systems and methods for generating large quantities of domain-specific test data that is realistic, internally consistent, and contextually rich. A data generation system provides for generating domain-specific, context-sensitive data collections. Such data can be generated and regenerated to provide increasing sophistication. For example, data can be generated under a first set of user-defined rules for initially relating the data to each other and a specified domain and regenerated under a second set of user-defined rules that impose higher levels of relationships among the data to more closely model the specified domain or parameters intended for testing. The generated test data preferably resides in computer-readable memory for use directly or indirectly with computer data processing systems.

One version of the invention provides a method for making computer-readable memory containing test data useful for testing a data processing system for processing domain specific data. The method includes composing a template containing a plurality of fields. A data type is selected for each field from among a plurality of predefined data types that specify sources of data for populating the fields with values and relationships among the fields. At least one of the fields is a multi-value field containing a plurality of field parts that are related to each other as if the field parts were different fields in a predefined template. At least one of the data types is a multi-value field accessor that extracts a value from a field part of the multi-value field for influencing a value of another field. The fields within the template are populated with values according to the data type of each field. A subset of the values populating the fields is retrieved for generating a data set. The steps of populating and retrieving are repeated for assembling a plurality of data sets, which are written into computer-readable memory so that the memory is useful for supplying test data to the data processing system.

Another version of the invention presents a computer system for generating within a computer-readable memory test data useful for testing a data processing system. A composition module is accessible through a graphical interface and in communication with a data store for defining a data generation template. The data generation template contains a plurality of fields each capable of holding a value according to one or more rules. The composition module executes a set of instructions stored within a computer readable medium for accessing the data store to present through the graphical interface predetermined options for defining the fields as particular data types, including fields whose values are affected by the values in other fields. An evaluation module executes a set of instructions stored within a computer readable medium for sorting the fields in an order of dependency so that fields whose values affect the values in other of the fields are ordered before the fields whose values are affected by values in other fields. A data generation module in communication with a library of data files executes a set of instructions stored within a computer readable medium for (a) populating the plurality of fields with values according to the rules having regard to the order of the sorting, (b) retrieving a subset of the values populating the plurality of fields for generating a data set, (c) repeating steps (a) and (b) for creating a succession of data sets, and (d) writing the succession of data sets into the computer-readable memory. Preferably, the computer system also includes a transformation module that executes a set of instructions stored within a computer readable medium for reformatting the succession of data sets and for writing the reformatted succession of data sets into the computer-readable memory.

Another version of the invention provides a method of generating test data with a modified test data generator template stored in a data store for testing a data processing system. The template is loaded from the data store into a graphical user interface and opened within the graphical user interface to access a plurality of fields each defined by a selected data type data specifying sources of data for populating the fields with values and relationships among the fields. The data type of at least one of the fields is modified to match a relationship between fields of actual data intended for processing by the data processing program. The plurality of fields is populated with values according to rules specified by the selected data type. One or more of the fields is tagged according to the outcome of the rules specified by the selected data type. A subset of the values populating the plurality of fields is retrieved along with one or more tags for recording the outcome of the rules associated with the value of one or more fields for generating a data set. The steps populating and retrieving are repeated for creating a succession of data sets, which are written into the computer-readable memory in a form useful for supplying test data to the data processing system.

Yet another version of the invention provides method for composing a compound template for generating test data useful for testing a data processing system for processing domain specific data. The method includes composing a first template containing a plurality of fields and selecting a data type for each field within the first template from among a plurality of predefined data types that specify sources of data for populating the fields of the first template with values and relationships among the fields of the first template. In addition the method includes composing a second template containing a plurality of fields and selecting a data type for each field within the second template from among a plurality of predefined data types that specify sources of data for populating the fields of the second template with values and relationships among the fields of the second template. The first template is incorporated into the second template as a multi-value field. At least one of the data types within the second template is a multi-value field accessor that extracts a value from a field part of the multi-value field for influencing a value of another field with the second template. The second template is stored within computer-readable memory and made available in an electronic form for generating test data useful for testing data processing systems for processing domain specific data.

The step of selecting the data type for each field within the second template preferably includes choosing from among a plurality of templates made available as template data types for defining multi-value fields within the second template. The selected data types of the fields within the first template preferably define data representative of a common domain of data and the selected data types of the fields within the second template preferably further define the data in a form more representative of the common domain.

BRIEF DESCRIPTION OF THE DRAWING FIGURES

FIG. 4 is a screen shot of the graphical interface presenting options for inputting global information into a net template named "demo".

FIG. 5 is a screen shot of the graphical interface presenting options for adding a new field (row) named "Person 1".

FIG. 6 is a screen shot of the graphical interface presenting options for defining a data type "person" for the field "Person 1".

FIG. 7 is a screen shot of the graphical interface presenting options for defining a field part "Name.Capitalization" within the data type "person" for the field "Person 1".

FIG. 8 is a screen shot of the graphical interface presenting options for defining a field part "LastName" within the data type "person" for the field "Person 1".

FIG. 9 is a screen shot of the graphical interface showing the addition of a new field (row) named "Person 1 Age" and presenting options for defining a data type "NumberRange" for the field "Person 1 Age".

FIG. 10 is a screen shot of the graphical interface showing the addition of a new field (row) named "Person 2 Age" and presenting options for defining a data type "BoundedRange" for the field "Person 2 Age".

FIG. 11 is a screen shot of the graphical interface showing the addition of a new field (row) named "Person 1 Last Name" and presenting options for defining a data type "Multiple Value Field Accessor" for operating on data from the field part "LastName" within the field "Person 1".

FIG. 12 is a screen shot of the graphical interface showing the addition of a new field (row) named "Person 2 Last Name" and presenting options for defining a data type "Multiple Value Field Accessor" for operating on data from the field part "LastName" within the field "Person 1".

FIG. 13 is a screen shot of the graphical interface showing he completed template "demo" including the "Data Generation Options" for formatting the output, the "Template Options" for globally defining the data, and a succession of fields for defining the data elements within each set of data generated.

FIG. 19 is a screen shot of the graphical interface showing the generation of data and the option for downloading the data through a communication interface.

FIG. 20 is a screen shot of the graphical interface showing a data type "Field Math" containing an option for deliberately introducing mistakes into the generated data.

FIG. 21 is a screen shot of the graphical interface showing a data type "OMR String" containing options for presenting representative data for filling a set of checkboxes.

FIG. 22 is a screen shot of the graphical interface showing a data type "If Then Else Field" containing options for logically relating multiple fields.

DETAILED DESCRIPTION OF THE INVENTION

Figure 1:
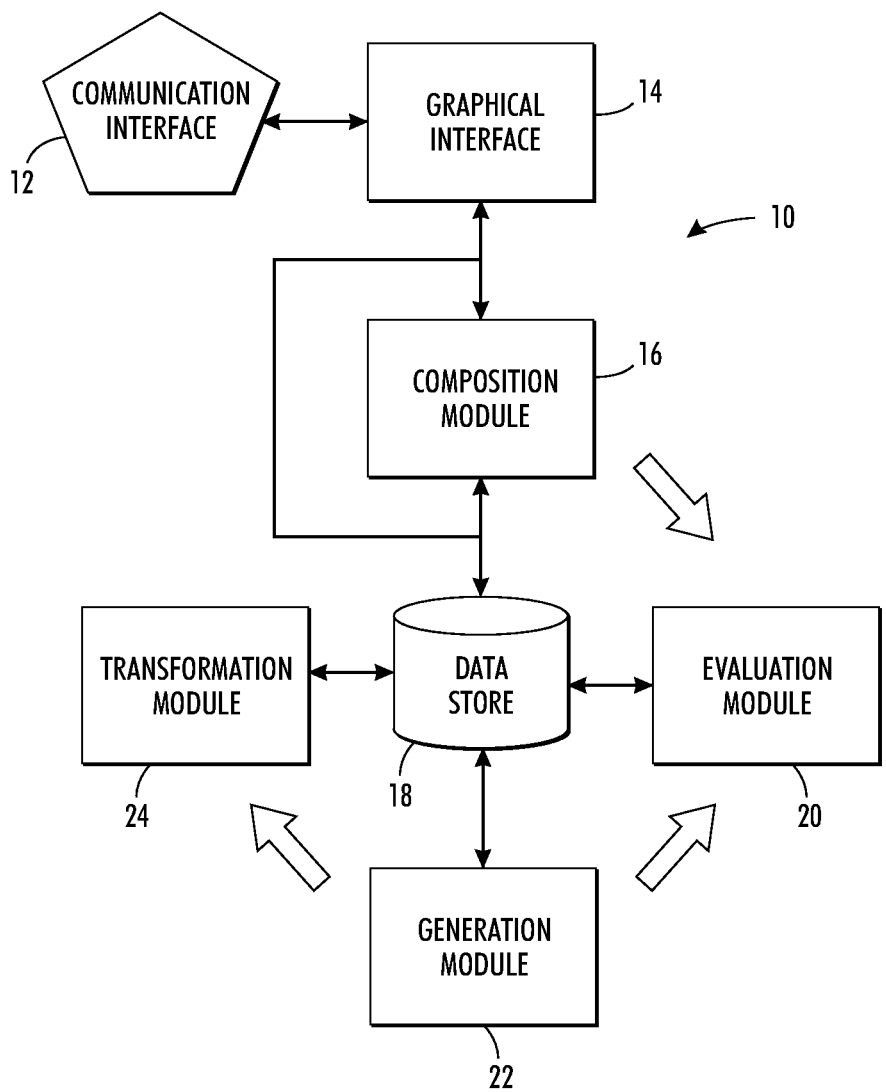
FIG. 1 is a schematic diagram of a synthetic data generating system according to the invention.

A system 10 for generating synthetic data sets is laid out in FIG. 1. The synthetic data is intended to represent realistic data, conforming to statistically acceptable trends and exhibiting internal consistency. The system 10 is arranged for creating large sets of meaningful data for testing sophisticated document processing systems, which can include testing the performance of complex business rules, or data mining applications. Although realistic to the systems under test, the synthetic data can contain built-in anomalies that can be tracked through the system under test to gauge particular responses of the systems.

As shown in FIG. 1, the synthetic data generation system 10 is accessible through a communication interface 12 using a standard web browsing client (e.g., Mozilla® Firefox® web browser, registered trademarks of Mozilla Foundation or Microsoft® Internet Explorer® web browser, registered trademarks of Microsoft Corporation). A graphical interface 14, accessible through the communication interface 12, communicates directly or indirectly through a composition module 16 to a data store 18, which preferably includes a server on which the synthetic data is stored. The composition module 16 guides users through the generation of new synthetic data by creating new data generation templates or by revising existing data generation templates. Once created and saved in the data store 18, the synthetic data can be downloaded for testing data processing or data mining applications. The synthetic data can be used directly as an electronic file, such as for testing processing systems for electronic data, or can be further converted into electronic or paper images, such as for testing forms processing systems.

Figure 2:
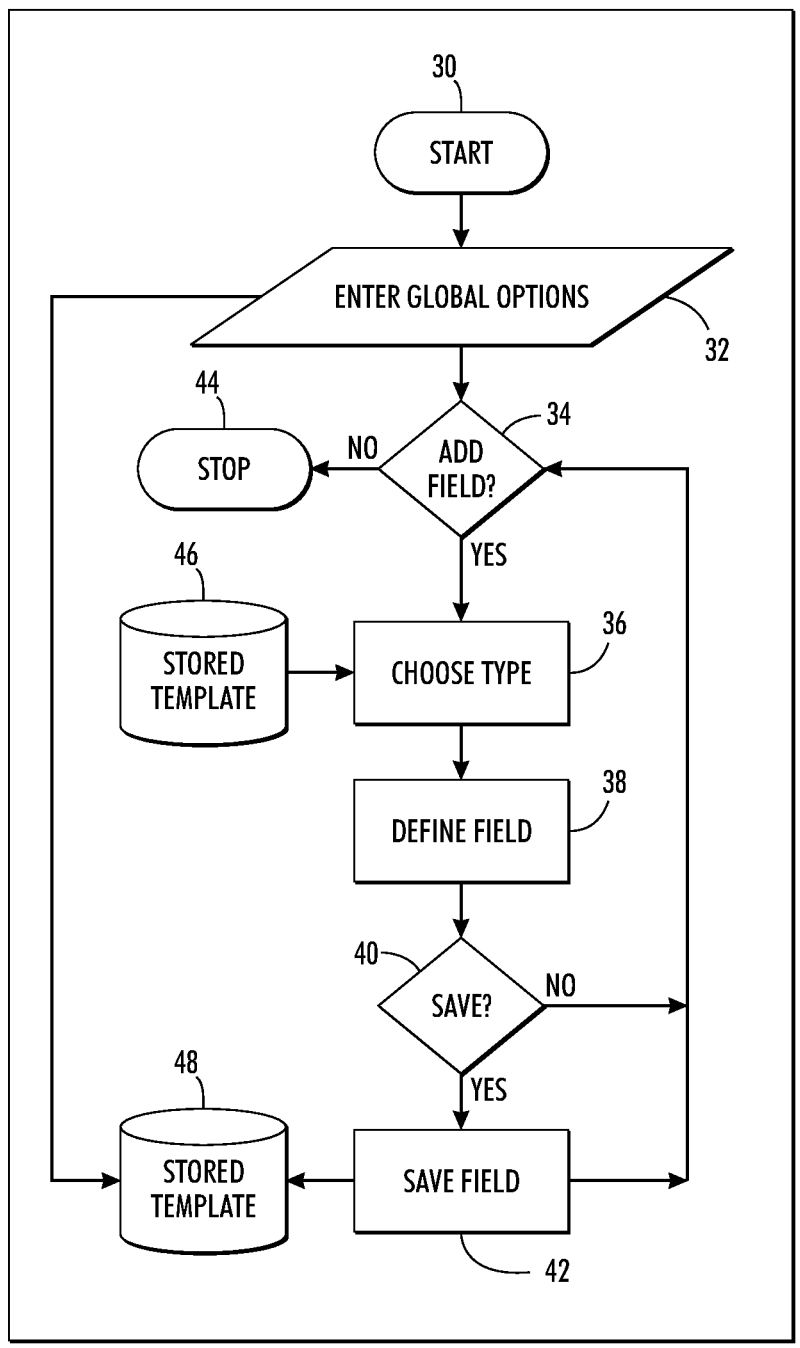
FIG. 2 is a flow chart of processing steps performed within a composition module.
Figure 3:
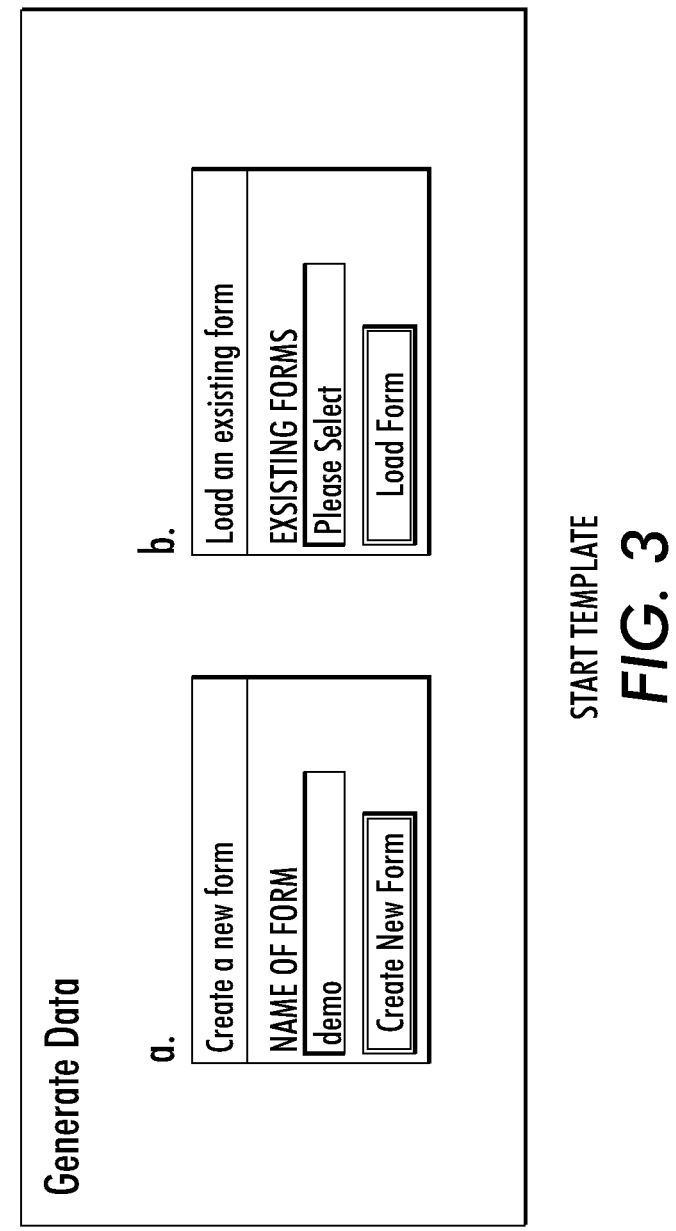
FIG. 3 is a screen shot of the graphical interface presenting options for creating a new template or modifying an existing template.

FIG. 2 presents a processing layout of the composition module 16 (see FIG. 1) for creating a new data generation template. Following the start 30 of a routine that is intended for creating a new data generation template and that is supported by a computer processor, global information is added at step 32 specifying (a) the intended output format for the generated data, such as HTML (HyperText Markup Language), Auto DTD (Document Type Definition) input, CSV (Comma Separated Values), or LM-DRIS Truth (Lockheed Martin Decennial Response Integration System) (b) the number of data sets to be generated, and (c) global data descriptions. A screen shot for starting a new template is shown in FIG. 3, and a screen shot for inputting global information is shown in FIG. 4. The global data descriptions presented under the heading "Template Options" include a choice of country, a choice of language, and a choice of filter options. The options depicted are, of course, examples and many other choices can be provided for globally characterizing the data, including specifying domain-specific data such as Census data, Internal Revenue Service data, or electronic medical records, or financial records including transaction auditing. Once selected, the global data descriptions are stored in a data base as a part of the stored template 46.

Figure 6:
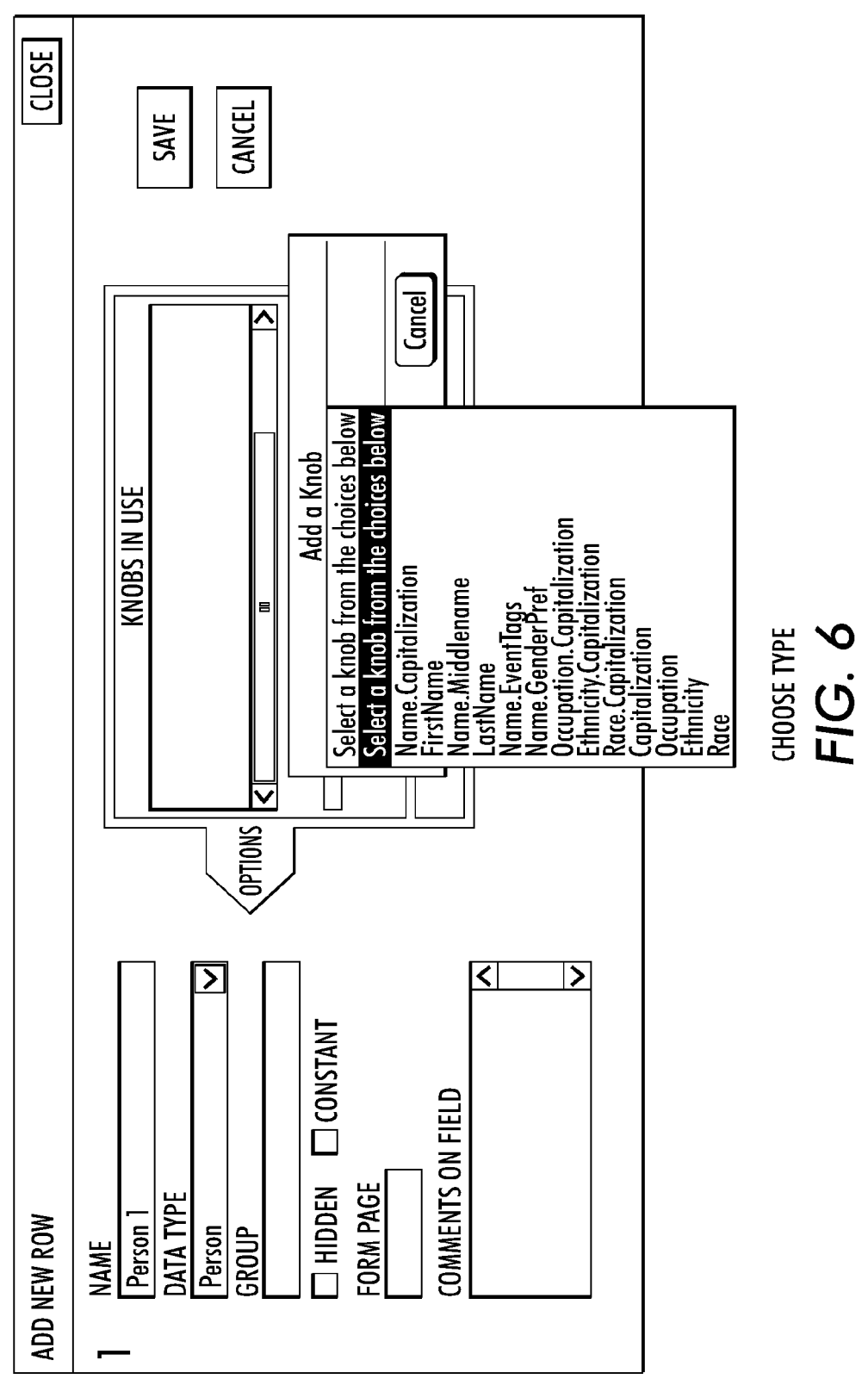

A series of steps 34 through 42 provide for generating individual fields of the template. Step 34 queries whether a new field is to be added to the template. Each new field can be considered a row of the template. If yes, processing proceeds to step 36 for choosing the type of field. If no, processing stops, the template is considered complete. After choosing the field type, step 38 provides for defining the field including any field parts. FIG. 5 contains a screen shot for adding a new field "Person 1", and FIG. 6 contains a screen shot for choosing the type of data defined for the instant field. Of course, provisions can be made for editing the fields of existing templates where existing choices can be changed (see for example the screen shot of FIG. 3). In addition, as can be seen in FIGS. 5 and 6, the field can be grouped with other specified fields, and resulting data can be hidden from the output or rendered constant. Individual fields can be assigned to a group so that specific operations addressing the individual fields can be extended to collectively address a group of fields. If the data is intended to represent the content of a form, the page of the form can be specified. Explanatory comments can also be saved.

The choice of data type opens a new level of options for further defining the data type, including the ability to specify or apply predetermined rules and constraints. The data types are drawn from a database of field options 46 (see FIG. 2). For example, as shown in the screen shot of FIG. 6, a data type "Person" is specified, which includes options for defining a plurality of field parts, including "Name.Capitalization", "FirstName", "Name.Middlename", "LastName", "Name.EventTags", "Name.GenderPref", "Occupation.Capitalization", "Ethnicity.Capitalization", "Capitalization", "Occupation", "Ethnicity", and "Race". Options for defining the field part "Name.Capitalization" are depicted in the screen shot of FIG. 7. The choice selected is that 100% of the generated names are intended to have a first letter capitalized and the remainder of the letters in each name lower case. The screen shot of FIG. 8 depicts options for defining the field part "LastName", including specifying the source of the data for the surname (i.e., last name). A choice is made to select data elements for the field part "LastName" from a library data base referred to as "surnames". Similar selections were made for the field parts "FirstName" and "Name.Middlename" for sourcing and otherwise defining last and middle names. The same database of given names can be specified for both field parts "FirstName" and "Name.Middlename". Custom text file lists of names representative of particular populations (including particular names and the frequency with which the particular names occur within the represented population) can be added to the library data base using a conventional tools utility. The custom test file is then among the files that can be chosen from the library data base for sourcing the first, middle, or last names.

Each time executed, the field "Person 1" is defined to return a full name assembled from the three field parts "FirstName", "Name.Middlename", and "LastName" drawn from designated library data bases in the specified format of upper and lower case letters. As also shown on the screen shots of FIGS. 7 and 8, a choice can be made whether to save or cancel the selections made for the new field corresponding to step 40 of the flow chart in FIG. 2. If yes (i.e., "SAVE"), the field definition is saved at step 42 to the data base of the stored template 46 and control is returned to the decision step 34 for entering additional fields. If no, (i.e., "CANCEL") control is also returned to the decision step 34 for entering additional fields without saving the instant field definition.

Figure 9:
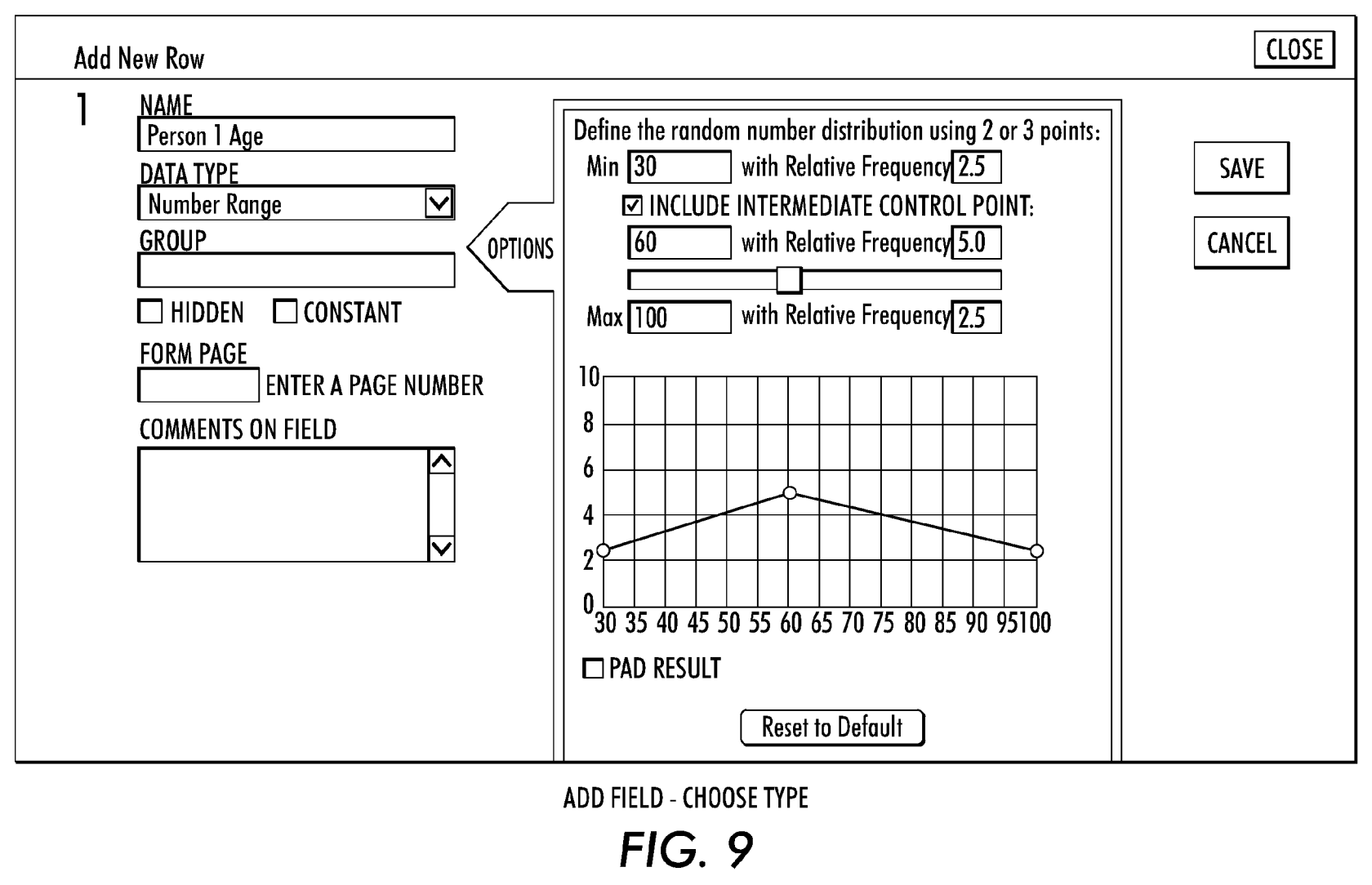

In the representative template "demo" illustrated under construction, following the addition and definition of another field named "Person 2", two single part fields named "Person 1 Age" and "Person 2 Age" are added and defined as illustrated by FIGS. 9 and 10. The data type for the field "Person 1 Age" is "Number range", which returns a single number within a specified range between 30 years and 100 years with a frequency of 2.5 per 100 at each end of the range and a peak of 5 per 100 for values of 60 years. Adjustments can be made to the range and frequency of the values returned within the range. Options for result padding, such as appending "years old" to the output are also provided but not exercised. The data type for the field "Person 2 Age" is "Bounded Range", which returns a single number within a range referenced to one or more other values. In this instance as depicted in FIG. 10, the value returned is the value returned in Field #3, i.e., "Person 1 Age", reduced by a number between 28 years and 40 years.

In the scheme envisioned for the data generated within the template "demo", "Person 1" represents the head of the household. As such the age of "Person 1", the first named person of the given household, is constrained between 30 years and 100 years.

After defining "Person 2 " as a data type "Person" representing a second member of the household, a data field type for "Number Range" is defined for "Person 2 " in relation to the instant age of "Person 1". "Person 2 " is envisioned as a dependent child of "Person 1" having an age offset by one generation. Thus, the age of "Person 2 " is a negative offset of the age of "Person 1" within the same household by between 28 and 40 years. Error checking is provided to reject results where the age of "Person 2 " is less than 0 years.

Incremental definition of the household within the template "demo" continues with the addition of fields "Person 1 Last Name" and "Person 2 Last Name" as shown in the screen shots of FIGS. 11 AND 12. Each of the two new fields has a "Multiple Value Field Accessor" data type, which is used to access the value of a single field part from a template field that contains multiple field parts with associated values. The "Multiple Value Field Accessor" for both "Person 1 Last Name" and "Person 2 Last Name" draws values from the "Last Name" field part of Field #1. Thus, whatever last name might have been downloaded into field part "LastName" in Field #2 for the field "Person 2 ", the field value for field "Person 2 Last Name" is forced to match the field value for the field part "LastName" in the field "Person 1". This constraint provides realistic data for a two person household of parent and child in which both are expected to share the same last name.

As described above by way of example, each field or field part can be defined by exercising options provided by predefined data types. The options for each data type, which can be understood as data control "knobs", provide for (a) sourcing the data, such as from library data bases, custom lists, random number generators, or other fields, (b) relating data among the other fields or field parts within the template for internal consistency, and (c) achieving statistical validity over distributions of the sourced data between different data sets or records (i.e., over multiple instances in which the template is populated). Thus, internally consistent, realistic data can be generated by matching the sourcing, internal consistency, and statistical validity to known attributes of actual data within particular data domains.

Once the last field is defined and saved, the template is complete and processing stops as shown at step 44 in the flow chart of FIG. 2. A screen shot showing the completed template "demo" is shown in FIG. 13 listing the "Data Generation Options" for formatting the output, the "Template Options" for globally defining the data, and a succession of fields for defining the data elements within each set of data generated. Also apparent within the listed "Template Options" is the ability to individually edit the fields added to the template. Once defined as an existing template, e.g., "demo", the template is accessible for later modification, update, or further development as shown among the options in the screen shot of FIG. 3. For example, the template can be further developed to better correspond to actual data within a particular domain or to construct new data processing tests for detecting or otherwise managing anomalies within the data. An XML representation of the two-person household template "demo" described above is given below:

```
<template content="rules,options" name="demo"
   guid="950e9995bd70931b780ebd5972eb31b7" version="1.0">
     <last_generation_options/>
     <fields>
        <field id="1" name="Person 1" type="Person" hidden="false" constant="false"
            page="" removed="false" comments="">
           <options>
              <option user="default" name="cap_upper">false</option>
              <option user="default" name="cap_lower">false</option>
              <option user="default" name="cap_first">false</option>
              <option user="default" name="cap_uword">false</option>
              <option user="default" name="cap_random">false</option>
              <option user="default" name="cap_per_upper"/>
              <option user="default" name="cap_per_lower"/>
              <option user="default" name="cap_per_first"/>
              <option user="default" name="cap_per_uword"/>
              <option user="default" name="cap_per_random"/>
              <option user="default" name="example"/>
           </options>
        </field>
        <field id="2" name="Person 2" type="Person" hidden="false" constant="false"
            page="" removed="false" comments="">
           <options>
              <option user="default" name="cap_upper">false</option>
              <option user="default" name="cap_lower">false</option>
              <option user="default" name="cap_first">false</option>
              <option user="default" name="cap_uword">false</option>
              <option user="default" name="cap_random">false</option>
              <option user="default" name="cap_per_upper"/>
```

```
            <option user="default" name="cap_per_lower"/>
            <option user="default" name="cap_per_first"/>
            <option user="default" name="cap_per_uword"/>
            <option user="default" name="cap_per_random"/>
            <option user="default" name="example"/>
        </options>
    </field>
    <field id="3" name="Person 1 Age" type="Number-Range" hidden="false"
        constant="false" page="" removed="false" comments="">
        <options>
            <option user="default" name="numRangeMin">30</option>
            <option user="default" name="numRangeMax">100</option>
            <option user="default" name="constrainMode_CB">false</option>
            <option user="default" name="numRangeMode"/>
            <option user="default" name="resultPadding">false</option>
            <option user="default" name="resultPadLength"/>
            <option user="default" name="resultPadChar"/>
            <option user="default" name="resultPadLeft">true</option>
            <option user="default" name="min_relFreq">2.5</option>
            <option user="default" name="max_relFreq">2.5</option>
            <option user="default" name="cp1_relFreq">5.0</option>
            <option user="default" name="example"/>
        </options>
    </field>
    <field id="4" name="Person 2 Age" type="Bounded-Number-Range"
        hidden="false" constant="false" page="" removed="false" comments="">
        <options>
            <option user="default" name="offset">true</option>
            <option user="default" name="resultPadding">false</option>
            <option user="default" name="range_min">MinField</option>
            <option user="default" name="range_max">MaxField</option>
            <option user="default" name="offset_op">Sub</option>
            <option user="default" name="testResultGoalMin">1</option>
            <option user="default" name="testResultGoalFieldMin">3</option>
            <option user="default" name="testResultGoalMax">10</option>
            <option user="default" name="testResultGoalFieldMax">3</option>
            <option user="default" name="offsetNumRangeMin">28</option>
            <option user="default" name="offsetNumRangeMax">40</option>
            <option user="default" name="resultPadLength"/>
            <option user="default" name="resultPadChar"/>
            <option user="default" name="example"/>
        </options>
    </field>
    <field id="5" name="Person 1 Last Name" type="MultiValueFieldAccessor"
        hidden="false" constant="false" page="" removed="false" comments="">
        <options>
            <option user="default" name="field">1</option>
            <option user="default" name="mvdfSelectionOption">Person</option>
            <option user="default" name="option">LastName</option>
            <option user="default" name="example"/>
        </options>
    </field>
    <field id="6" name="Person 2 Last Name" type="MultiValueFieldAccessor"
        hidden="false" constant="false" page="" removed="false" comments="">
        <options>
            <option user="default" name="field">1</option>
            <option user="default" name="mvdfSelectionOption">Person</option>
            <option user="default" name="option">LastName</option>
            <option user="default" name="example"/>
        </options>
    </field>
    </fields>
</template>
```

The fields used for constructing the template can be defined to hold, in addition to their specified constraints or rules, single or multiple data elements. Simple fields, such as "Person 1 Age" and "Person 1 Last Name", each contain a single field part holding a single data element. Multi-value fields each contain a plurality of field parts collectively holding multiple data elements. Within the multi-value fields, the multiple field parts can define parts of integrated data structures, such as a full name (e.g., the "Person" type field of the above example), which can include field parts holding separate values for first name, middle name, and last name. The "Multiple Value Field Accessor" data type extracts values from specified field parts of the multi-value fields.

A plurality of simple or multi-value fields can be combined within a template or otherwise integrated to form a so-called super field. For example, a "Household" super field can contain internally consistent data associated with collections of persons that might live together within a single residence, including families with parents and children. The included multi-value fields within the "Household" super field can contain, for example, full names of persons (first, middle and last names), an address of the household (e.g., house number, apartment number, street, city, state, and zip code), and a telephone number of the household (e.g., area code, exchange, number). In addition, the "Household" super field can include a plurality of single value fields containing information about the race, ethnicity, and occupations of the household members.

Figure 14:
FIG. 14 is a screen shot of the graphical interface showing a super field (row) named "Household" based on a data type "Household Structure" containing a plurality of separately definable field parts.
Figure 15:
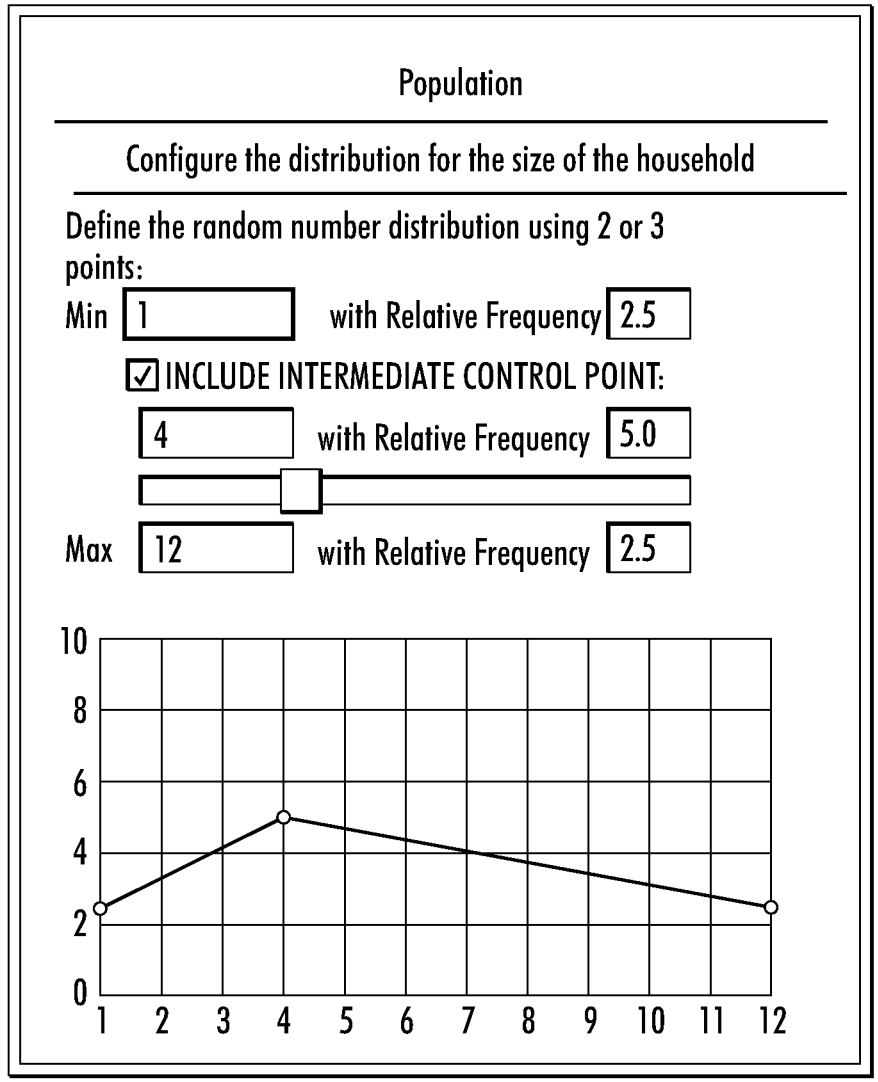
FIG. 15 is a screen shot of the graphical interface showing options for defining a field part "Population" within the data type "Household Structure" of the super field named "Household".

For example, as shown in FIG. 14, a single "Household Structure" data type of a super field can contain a large number of pre-related field parts containing the data described above as well as fields for formatting the data and choosing the number of household members and familial relationships among the members. As a part of the "household" super field, the user can select the field part "population" as shown in FIG. 15 for defining the minimum and maximum number of members in the households (i.e., household size) and the relative frequencies at which the different size households occur within the total number of households to be generated. Familial relationships among the persons of the house can be assigned by choosing among valid combinations of familial relationships with different numbers of members according to a predetermined frequency distribution.

The super field can also include a plurality of predefined and pre-related field parts such as established for last name and age for the two-person household of the "demo" template. The super field can also be combined with other multi-value or single value fields within a template, especially fields with a "Multiple Value Field Accessor" data type for extracting and manipulating data held by the super field for generating output data sets.

For example, the rules and constraints imposed upon the field parts of the super field produce a fully self consistent collection of attributes appropriate to a randomly selected typical household within the given population. More specific connections between the household members can be established by using additional fields make assignments between the attributes of the household (i.e., relate data within the "Household" field parts). As these assignments are made, consistency logic can be incorporated to alter those attributes that are not being explicitly set, but which must for consistency maintain a given relationship with respect to an attribute being assigned, so that the full collection of attributes provided by "Household" super field for each household member and for the household overall are maintained.

Error checking, not explicitly shown, can be incorporated within the composition of the template to identify inconsistencies or contradictions within the rules or constraints applied. Depending on the type of error as the error might affect the realism or more fundamental logical construction of the data, provisions can be made for rejecting field definitions or flagging potential problems.

Figure 16:
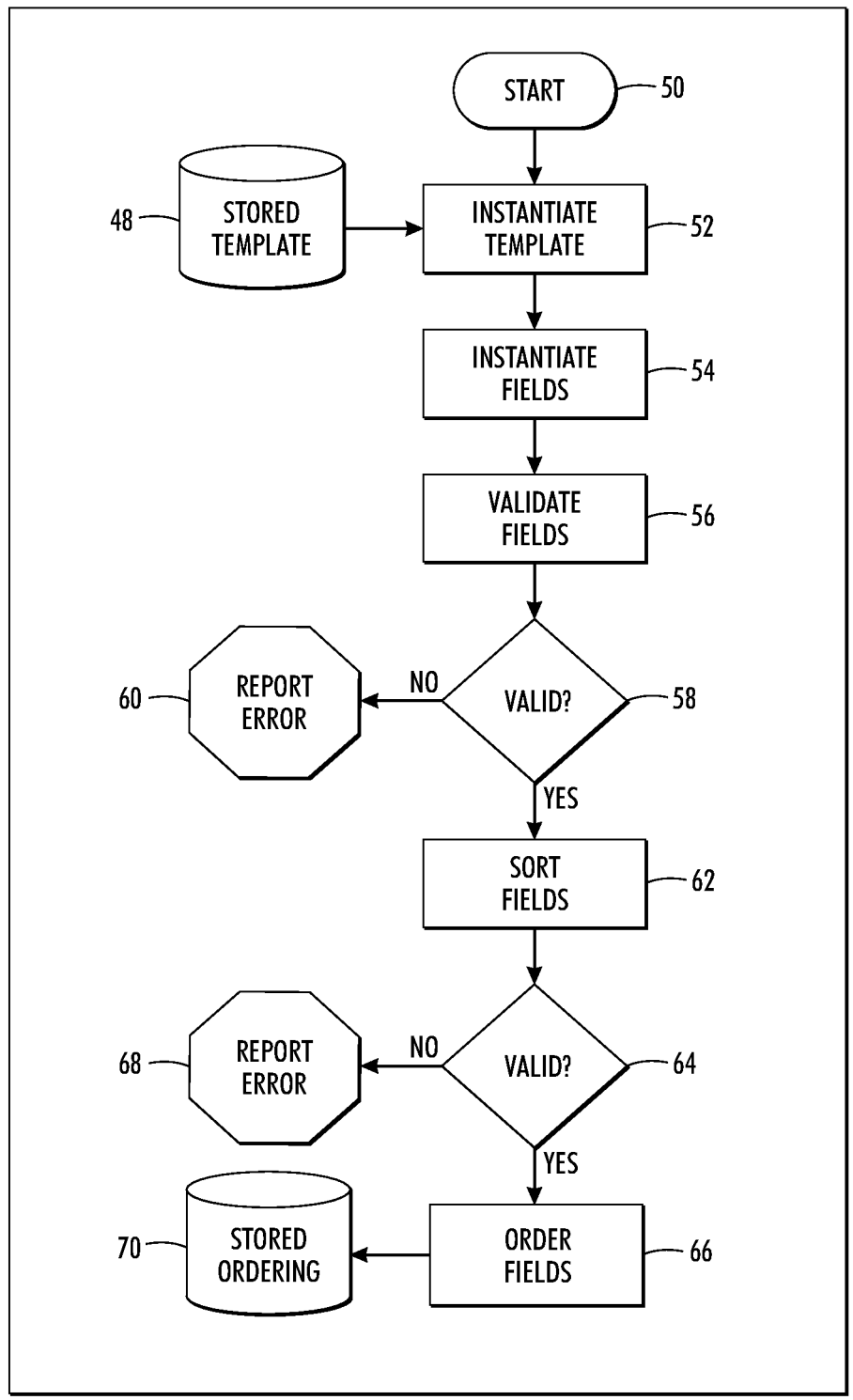
FIG. 16 is a flow chart of processing steps performed within an evaluation module.

A more thorough evaluation of the composed template is performed by the evaluation module 20 (see FIG. 1) that is automatically invoked by a command to generate data (see "GENERATE DATA" button in FIG. 13). A procedure for evaluating the template is depicted in FIG. 16. Starting at step 50, the evaluation module instantiates at step 52 the template drawn from the data store 18 containing the stored template 48. At step 54, the fields within the template are instantiated. Once residing in a processable form, the fields are validated individually for inconsistencies or contradictions at step 56. At step 58, a decision is made before proceeding further as to whether the fields in the template are valid or not. If all of the fields are not individually valid processing stops at step 60 and a descriptive error message is posted. If all of the fields are individually valid, a sort routine is invoked at step 62.

Within the sort routine, the fields within the template are ordered so that for any given field, the fields on which the given field depends will be evaluated before the given field is evaluated. That is, the "used" field should be ordered before the "using" field. Equivalently, if a field modifies a value (such as in an IF-THEN conditional data type), the modifying field must be invoked after the modified field is calculated so that the natural calculation of the modified field does not overwrite the modifying field's results. As a first step within the sort algorithm, interdependent fields are grouped together. Next, a "must-follow" list is formed for each of the fields within the group according to the principles outlined above (i.e., for each field a list of fields that must be evaluated first). A topological sort of the fields is performed within the group. Successive groups of interdependent fields are sorted similarly until all of the fields within the template are sorted in order. The field parts within a super field are preferably pre-sorted as if the field parts were fields arranged within an independent template.

Once a sort order is established, the new field order is tested at step 64 for overall logical consistency, particularly for identifying any circular dependencies. If the sort order evaluates as valid, the order of the fields is finalized at step 66 and the sort order is stored in the data store 18 as the stored ordering 70.

Figure 17:
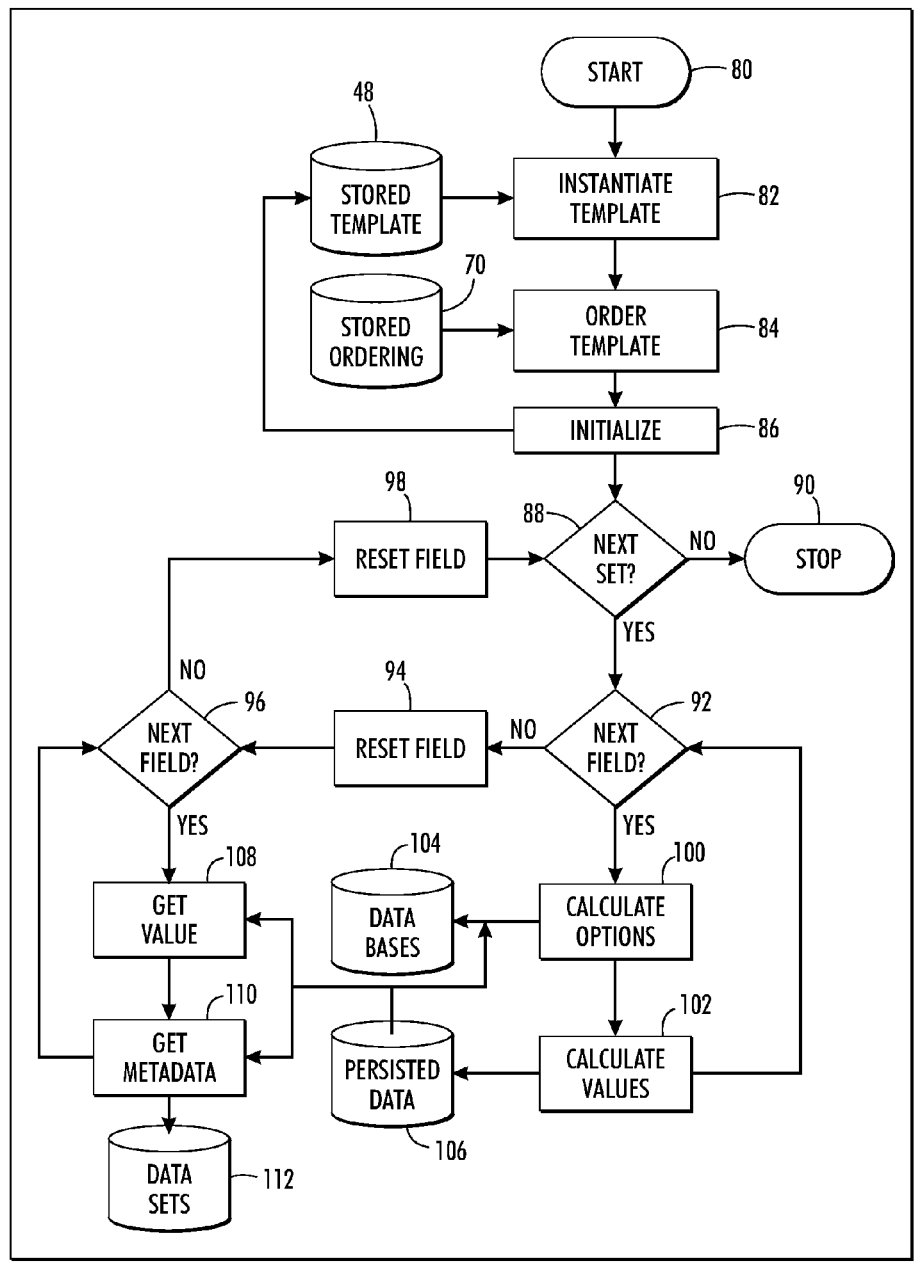
FIG. 17 is a flow chart of processing steps performed within a generation module.

The generation module 22 (see FIG. 1) also draws from the data store 18, starting at step 80 as shown in FIG. 17 for instantiating the template at step 82 based on the stored template 48 produced by composition module 16 and ordering the fields within the template at step 84 based on the stored ordering 70 produced by the evaluation module 20. At the following step 86, the instantiated and ordered template is initialized drawing on the global template options, which were also saved as a part of the stored template 48.

Nested iteration loops executed within the generation module provide for populating and retrieving selected data from the ordered fields within the template for creating individual data sets and for populating a succession of data sets according to the selected global option specifying the number of records to be generated. At decision step 88 of an outer iteration loop, processing continues within the outer loop if another data set remains to be populated to satisfy the global specification for the number of records to be generated (i.e., next set—yes). Once all of the required records are generated (i.e., next set—no), processing stops at step 90. At decision step 92 of a first inner iteration loop, processing continues within the first inner loop if another field within a data set remains to be populated (i.e., next field—yes). Once all the ordered fields of the template have been populated (i.e., next field—no), a field count within the template is reset at step and processing proceeds to a decision step 96 of a second inner iteration loop for retrieving specified data from each of the fields to assemble an individual data set. Processing continues within the second inner iteration loop if data remains to be retrieved from one of the fields (i.e., next field—yes). Once the specified data has been retrieved from all of the fields (i.e., next field—no), the field count is again reset at step 98 and control is returned to the outer iteration loop at decision step 88.

Within the first inner iteration loop, a calculate options step 100 passes the generation options for an individual field (i.e. the instructions for acquiring data). A calculate values step 102 populates the one of more field parts of the individual field with values according to the options passed in the preceding step and saves the results in persistent data 106. The calculate options step 100 makes the necessary connections with library data bases 104 or previously populated fields within the persistent data 106 for populating the one of more field parts of the individual field. In addition to populating the fields with values, the fields are also populated with metadata, which is preferably created each time a rule or constraint is invoked. The metadata can identify the rules invoked as well as results of the rules invoked. For example, the metadata can identify the lists (e.g., data bases) from which the data is sourced, the logical outcomes of conditional tests, the statistical distributions matched, and the truth values of data, particularly for event tags associated with deliberately engineered errors or specially planted data.

Within the second inner iteration loop, a get value step 108 retrieves selected data from one or more populated field parts of an individual field, and a get metadata step 110 retrieves selected descriptive matter in the form of metadata characterizing the selected data. Both the selected data and the metadata are stored for assembling the desired data sets 112. Selected data and metadata is not necessarily retrieved from each field in the template. Some fields hold hidden data, such as intermediate data useful for interrelating or calculating final results in other fields.

The succession of steps within the second inner iteration loop retrieve selected data and metadata from individual fields and the succession of loops performed by the second inner iteration loop populate an individual data set (i.e., a individual record). Multiple data sets (multiple records) are assembled by repopulating the fields through the first inner iteration loop and retrieving selected data and metadata from the repopulated fields through the second inner iteration loop as both loops are reset and indexed within the outer iteration loop that counts the data sets. The generated data sets can be individually written into computer-readable memory as the data sets 112 are retrieved or collectively written into computer-readable memory in one or more groups of the retrieved data sets.

Figure 18:
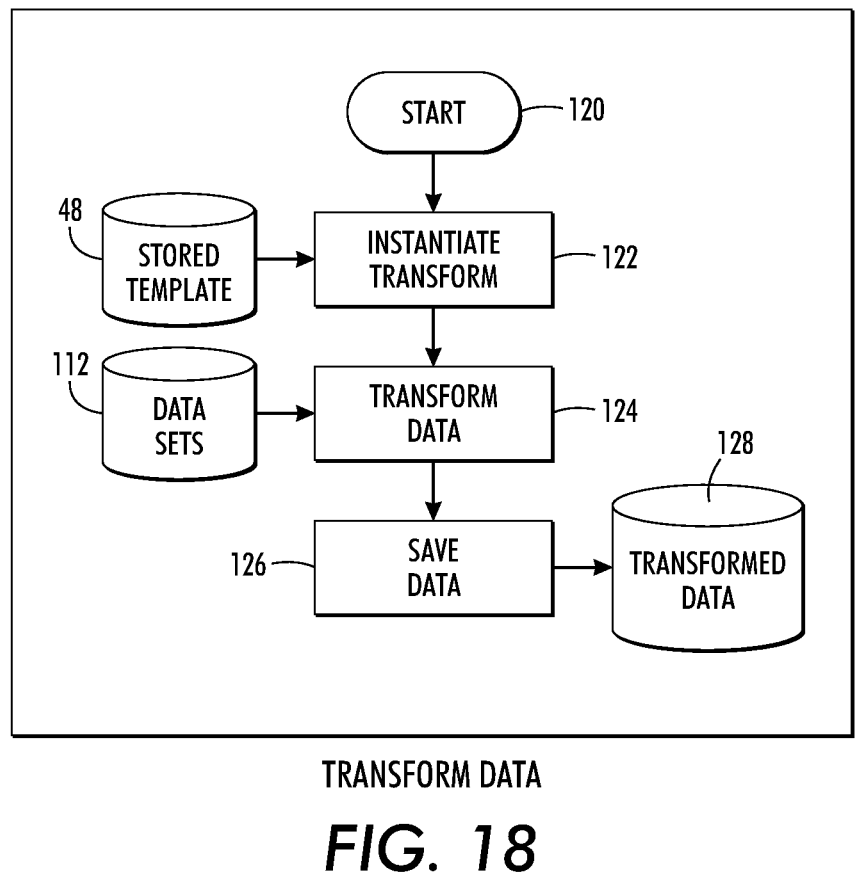
FIG. 18 is a flow chart of processing steps performed within a transformation module.
Figure 19:
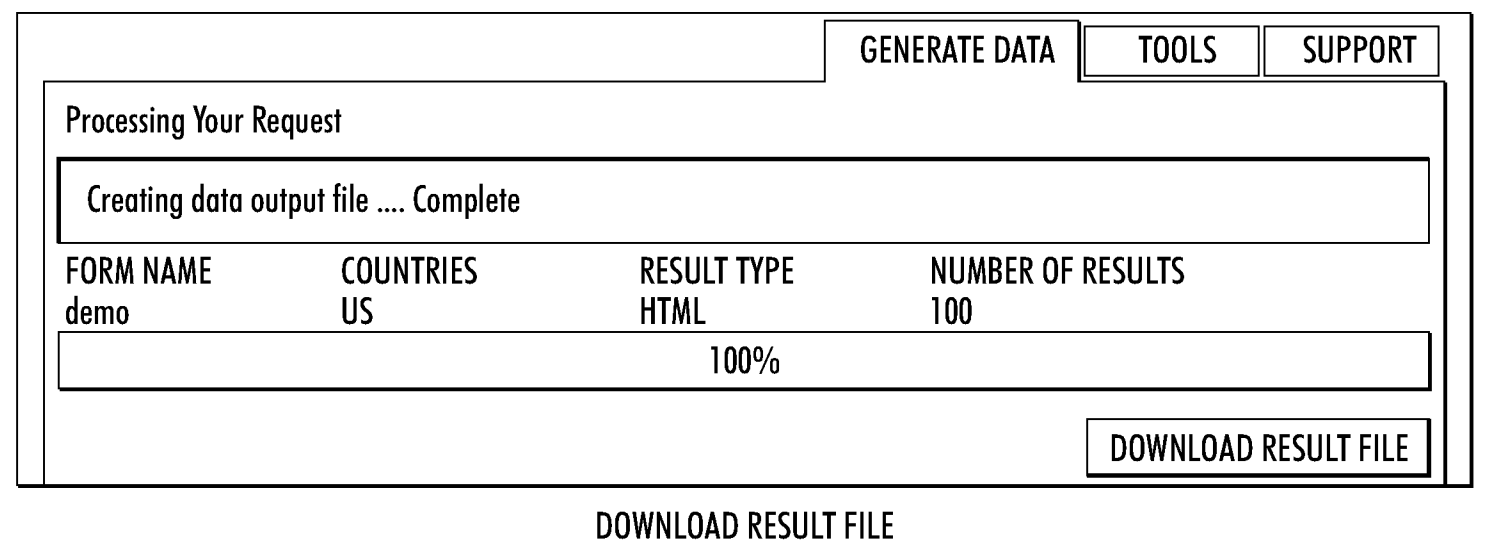

The transformation module 24 (see FIG. 1) also accesses the data store 18 for retrieving global data generation options within the stored template 48 as well as the data sets 112 produced by the generation module 22. Starting at step 120 in the transform data flowchart of FIG. 18, the transformation module 24 initiates the desired transform at step 122 based on the data generation options within the stored template 48, here as "HTML" (see FIG. 4 or 13). At step 124 the store data sets 112 are transformed from a generic representation into one or more specific representations in accordance with the intended use of the generated data as specified by the data generation options. The generated data sets in the specified representation is saved at step 126 into the data store 18 (see FIG. 1) as transformed data 128, which is accessible through the graphical interface 14 to the communication interface 12 for downloading as shown in the screen shot of FIG. 19. The data store 18 preserves data in a form of computer-readable memory and this memory is altered each time data is written into the data store 18 from one of the system modules, including the composition module 16, which writes the stored template 48, the evaluation module 20, which writes the stored ordering 70 of the template, the generation module 22, which writes the data sets 112, and the transformation module 24, which writes the transformed data 128 that is downloadable as synthetic test data. The various modules 16, 20, 22, and 24, as arranged to perform their specific functions, can be localized on one computer or distributed between two or more computers. The transformed data 128 can be viewed in table form through the graphical interface 14 or saved remotely through the communication interface 12 in preparation for its intended use.

The files downloaded from the synthetic data generation system 10 can be used directly for testing or analyzing automated document processing systems or data mining operations. Alternatively, the files can be further converted or incorporated into predetermined data structures such as forms that are reproducible in paper or as electronic images. For example, the synthetic data can be formatted to represent handwritten text appearing on data forms as shown and described in US Patent Application Publication No. 2006/0045344 entitled Handprint Recognition Test Deck and US Patent Application Publication No. 2008/0235263 entitled Automating Creation of Digital Test materials, with both applications being hereby incorporated by reference.

The invention as described above allows for the generation of increasingly sophisticated data including the ability to provide domain-specific context-sensitive data collections that can accurately mimic real data collected for processing. The increasing sophistication can be achieved by defining data fields in logical relations with one another within a first stage template structure and combining the multiple data fields in the first stage template structure into a single multi-value field within a second stage template structure in which the single multi-value field includes corresponding field parts that are similarly constrained for validity and internal consistency. Multiple stage templates can be assembled in this progression. For example, the multiple parts of persons names, addresses, and telephone numbers can each be combined into single multi-value fields for name, address, and telephone number, and the multi-value fields for name, address, and telephone number can be combined together with other relational fields into a single multi-value field for household (such multi-generational multi-value fields being referred to as super fields). Once a super field is defined, such as for capturing the many parameters of a household, additional fields can be added to append to and further refine relationships within the household or variations between the households for better matching statistical distributions or other definable trends within a modeled domain.

The increasing sophistication is also made possible by separately defining the output responses of the individual single and multi-value fields. Not all of the data populating individual fields necessarily contribute to the output data set. Many fields and field parts hold intermediate data used for generating other data or is rendered obsolete by the rules and specifications of other fields. For example, the field part for last name in the multi-value field for the full name of the second person of the household is replaced by the last name in the multi-value field for the full name of the first person of the household. The originally downloaded last name for the second person in the household is still retained within the populated fields of the template, but does not appear in the data sets generated by the template. The super field, "Household", although containing numerous field parts may report (i.e., contribute to the generated data set) only a single number each time poled, such as the number of persons in the household, with the other values held within the super field "Household" remaining unused or superseded by the values reported from other fields of the template. In addition, not all of the data that is extractable from the template fields, particularly the multi-value fields (super fields), may be required for particular applications under test, but the additional predefined relationships among the fields and field parts can provide a previously substantiated reservoir from which to draw new synthetic data.

While the generation of realistic internally consistent data is an overarching goal in most instances, the invention also provides for the incorporation of deliberately engineered errors or other anomalies within the synthetic data. The metadata, which can accompany the values reported from the template fields, can provide, as a part of the description of the values, an indication of the departure of particular values from known or expected standards or truths. For example, deliberate inconsistencies can be incorporated into the generated data sets with the presence of the inconsistent data flagged by the metadata within the generated data sets.

Figure 20:
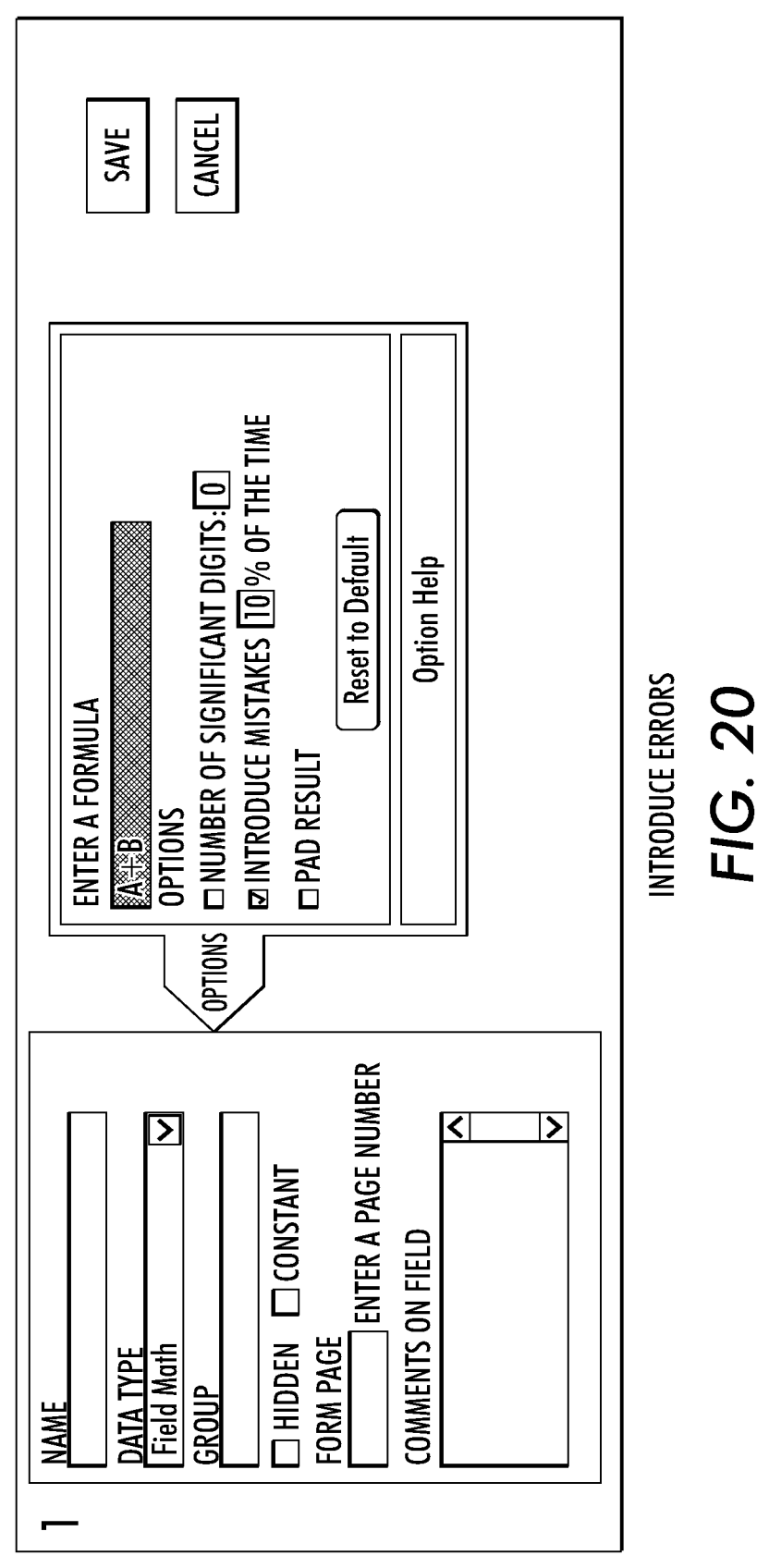

For example, FIG. 20 contains a screen shot of a field data type "Field Math" in which a formula is entered for generating logical results. However, the field is also defined to introduce mistakes 10 percent of the time. If a data processing program tested by such synthetic data is intended to discover errors of this sort, errors should be reported by the data processing program for 10 percent of the evaluated data.

The remaining FIGS. 21 and 22 present screen shots of alternative field data types useful for generating and relating data. The screen shot of FIG. 21 shows options for defining an optical mark recognition (OMR) string for creating synthetic respondent data for checkboxes. The format of marks, one for a respondent mark detected and the other for no respondent mark detected, can be defined as different characters. The length of the string can be specified corresponding to the number of checkboxes. Custom event tags can be used to track events that occur during the generation of data for the field. Index aliases can be used to distinguish among the checkboxes, such as for retrieving the state of a particular checkbox. Various selections can be made over the distribution over which the checkboxes are marked.

The screen shot of FIG. 22 shows options for defining an "If-Then-Else Field" data type for evaluating a logical expression to determine among various actions that can be taken for changing the values in various other fields. A plurality of conditions can be provided in a single "If/Then" data type field. Each such condition can test the value of a single field or the value in a field part of a multi-value field. Logical operators such as "AND" and "OR" can be used to connect conditions, which are evaluated in a logical order. The conditions can be grouped using multiple "IF-Then" fields and using results from one as field input for another. If the test expression evaluates to true, the actions in the "Then" clause are executed. If the test expression evaluates to false, the actions in the "Else" clause are executed (if present). If the test expression does not logically evaluate, neither the "Then" nor the "Else" actions are executed, and a "dice roll" can be substituted as a bypass.

Event tags can be assigned in metadata to track events that occur during the generation of data for conditional data type fields. For example, an event tag can be used to track both the occurrence of the "Then" event or the "Else" event. The event tags attach to the conditional data type fields and are retrievable in place of or in conjunction with any values reported by the conditional data type fields. The statements can be arranged to affect the values in individual fields or to collectively affect the values in a group of fields.

Although described with respect to a limited number of embodiments, those of skill in the art can readily apply the teachings of this invention to a wider array of examples for generating synthetic data that is realistic and internally consistent for testing desired performance criteria for different types of data processing operations.

The invention claimed is:

1. A method of making computer-readable memory containing test data useful for testing a data processing system for processing domain specific data comprising steps of
composing a template containing a plurality of fields,
selecting a data type for each field from among a plurality of predefined data types that specify sources of data for populating the fields with values and relationships among the fields,
at least one of the fields being a multi-value field containing a plurality of field parts that are related to each other as if the different field parts were different fields in a predefined template,
at least one of the data types being a multi-value field accessor that extracts a value from a field part of the multi-value field for influencing a value of another field,
populating the fields within the template with values according to the data type of each field, retrieving a subset of the values populating some but less than all of the fields for generating a data set, repeating the populating and retrieving steps for assembling a plurality of data sets, and writing the plurality of data sets into computer-readable memory so that the memory is useful for supplying test data to the data processing system;
wherein at least one of the fields includes a conditional data type that draws a value from one of the fields and differentially affects a value in yet another field based on a logical condition, and
the field parts of the multi-value field are subject to rules of consistency for describing different aspects of a common entity.

2. The method of claim 1 in which the selected data types define data representative of a common domain of data so that the values within the generated data sets are substantially internally consistent and statistically matched to actual data within the domain.

3. The method of claim 2 in which at least one of the data types provides for generating a limited number of anomalous values in the generated data sets that are not internally consistent and statistically matched to the actual data within the domain.

4. The method of claim 3 including a step of tagging the anomalous values with metadata that is written together with the anomalous values within the plurality of data sets into computer-readable memory.

5. The method of claim 1 including a step of sorting the fields within the template in an order of dependency so that the fields whose values affect values in other fields are ordered before the fields whose values are affected the values in other of the fields.

6. The method of claim 5 in which the step of sorting the fields within the template includes grouping interdependent fields and identifying lists of fields that affect a value in another field.

7. The method of claim 6 in which the step of populating includes populating the fields within the template in the order of the sorting.

8. The method of claim 1 in which the step of retrieving the subset of values includes retrieving values from less than all of the field parts of the multi-value field.

9. The method of claim 8 in which at least one of the fields includes a value drawn from one of the field parts of the multi-value field.

10. The method of claim 1 in which two of the fields are affected differently depending on the logical condition.

11. The method of claim 1 including a step of tagging the values affected by the logical condition with metadata that is written together with the affected values within the plurality of data sets into computer-readable memory.

12. The method of claim 1 including a step of assigning two or more fields to a group so that the values in the fields of the group can be collectively affected by the value in another field.

13. The method of claim 1 in which one of the data types defines a string of binary values for representing the contents of a plurality of checkboxes.

14. The method of claim 1 including a step of evaluating the fields within the template for logical consistency and reporting an error in response to logical inconsistencies.

15. The method of claim 1 including a step of converting the plurality of data sets into one or more specified data formats in advance of writing the plurality of records into computer readable memory.

16. A computer system for generating within a computer-readable memory test data useful for testing a data processing system comprising:
   a composition module operating by way of a processor and accessible through a graphical interface and in communication with a data store for defining a data generation template,
   the data generation template containing a plurality of fields each capable of holding a value according to one or more rules,
   the composition module being arranged for executing a set of instructions stored within a computer readable medium for accessing the data store to present through the graphical interface predetermined options for defining the fields as particular data types including fields whose values are affected by the values in other fields,
   an evaluation module arranged for executing a set of instructions stored within a computer readable medium for sorting the fields in an order of dependency so that fields whose values affect the values in other of the fields are ordered before the fields whose values are affected by values in other fields, and
   a data generation module in communication with a library of data files and arranged for executing a set of instructions stored within a computer readable medium for
   (a) populating the plurality of fields with values according to the rules having regard to the order of the sorting,
   (b) retrieving a subset of the values populating some but less than all of the plurality of fields for generating a data set,
   (c) repeating steps (a) and (b) for creating a succession of data sets, and
   (d) writing the succession of data sets into the computer-readable memory;
   wherein at least one of the fields includes a conditional data type that draws a value from one of the fields and differentially affects a value in yet another field based on a logical condition, and
   at least one of the fields is a multi-value field containing a plurality of field parts that are subject to rules of consistency for describing different aspects of a common entity.

17. The system of claim 16 further comprising a transformation module arranged for executing a set of instructions stored within a computer readable medium for reformatting the succession of data sets and for writing the reformatted succession of data sets into the computer-readable memory.

18. The system of claim 17 in which the composition module writes the data generation module to the data store, the evaluation module writes an order of the fields to the data store, the generation module writes the succession of data sets to the data store, and the transformation module writes the reformatted succession of data sets to the data store.

19. The system of claim 16 in which the plurality of field parts of the multi-value field are related to each other as if the field parts were different fields in a predefined template.

20. The system of claim 19 in which the predetermined options for defining the fields as particular data types include at least of the data types being a multi-value field accessor that extracts a value from a field part of the multi-value field for influencing a value of another field.

21. The system of claim 16 in which the data types are related to define data representative of a common domain of data so that the values within the generated data sets are substantially internally consistent and statistically matched to actual data within the domain.

22. The system of claim 21 in which at least one of the data types provides for generating a limited number of anomalous values in the generated data sets that are not internally consistent and statistically matched to the actual data within the domain.

23. The system of claim 22 in which the generated data sets include metadata tagged to the anomalous values, and the metadata is written together with the anomalous values within the succession of data sets into computer-readable memory.

24. The system of claim 16 in which the conditional data type field draws a value from one of other fields for arriving at a logical value that determines an action to be taken for affecting a value in another field.

25. The system of claim 24 in which the generated data sets include metadata tagged to a value of the conditional field, and the metadata is written together with the value of the conditional field within the succession of data sets into computer-readable memory.

26. The system of claim 16 in which at least one of the data types defines a string of binary values for representing the contents of a plurality of checkboxes.

27. A method of generating test data with a modified test data generator template stored in a data store for testing a data processing system comprising steps of loading the template from the data store into a graphical user interface,
   opening the template within the graphical user interface to access a plurality of fields each defined by a selected data type specifying sources of data for populating the fields with values and relationships among the fields,
   modifying the data type of at least one of the fields to better match a relationship between fields of actual data intended for processing by the data processing program,
   populating the plurality of fields with values according to rules specified by the selected data type, tagging one or more of the fields according to the outcome of the rules specified by the selected data type, retrieving a subset of the values populating the plurality of fields including one or more tags for recording the outcome of the rules associated with the value of one or more fields for generating a data set,
   repeating the steps populating and retrieving for creating a succession of data sets, and
   writing the succession of data sets into the computer-readable memory in a form useful for supplying test data to the data processing system;
   wherein at least one of the fields includes a conditional data type that draws a value from one of the fields and differentially affects a value in yet another field based on a logical condition, and
   one of the fields of the template is a multi-value field containing a plurality of field parts that are subject to rules of consistency for describing different aspects of a common entity.

28. The method of claim 27 in which the step of tagging identifies anomalies within the values creating the succession of data sets.

29. The method of claim 27 including a step of choosing among a plurality of global constraints through the graphical interface to better match the test data to actual data intended for processing by the data processing program.

30. The method of claim 27 in which the multi-value field holds a plurality of separately accessible values governed at least in part by rules of consistency for describing different aspects of a common entity, and in which the data type of one other fields of the template is a multiple value field accessor that accesses one of the values of the multi-value field.

31. The method of claim 30 in which at least one of the values in the multi-value field is not included in the succession of data sets written into the computer-readable memory.

32. A method of composing a compound template for generating test data useful for testing a data processing system for processing domain specific data comprising steps of composing a first template containing a plurality of fields, selecting a data type for each field within the first template from among a plurality of predefined data types that specify sources of data for populating the fields of the first template with values and relationships among the fields of the first template, composing a second template containing a plurality of fields, selecting a data type for each field within the second template from among a plurality of predefined data types that specify sources of data for populating the fields of the second template with values and relationships among the fields of the second template, incorporating the first template as a multi-value field within the second template, at least one of the data types within the second template being a multi-value field accessor that extracts a value from a field part of the multi-value field for influencing a value of another field with the second template, and storing the second template within computer-readable memory;

wherein at least one of the fields includes a conditional data type that draws a value from one of the fields and differentially affects a value in yet another field based on a logical condition, and the field parts of the multi-value field are subject to rules of consistency for describing different aspects of a common entity.

33. The method of claim 32 in which the step of selecting the data type for each field within the second template includes choosing from among a plurality of templates made available as template data types for defining multi-value fields within the second template.

34. The method of claim 32 in which the selected data types of the fields within the first template define data representative of a common domain of data and the selected data types of the fields within the second template further define the data in a form more representative of the common domain.

* * * * *